US010818014B2

(12) United States Patent
Xu et al.

(10) Patent No.: US 10,818,014 B2
(45) Date of Patent: Oct. 27, 2020

(54) IMAGE OBJECT SEGMENTATION BASED ON TEMPORAL INFORMATION

(71) Applicant: Adobe Inc., San Jose, CA (US)

(72) Inventors: Ning Xu, San Jose, CA (US); Brian Price, San Jose, CA (US); Scott Cohen, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 109 days.

(21) Appl. No.: 16/047,492

(22) Filed: Jul. 27, 2018

(65) Prior Publication Data
US 2020/0034971 A1 Jan. 30, 2020

(51) Int. Cl.
*G06T 7/11* (2017.01)
*G06T 7/194* (2017.01)
(Continued)

(52) U.S. Cl.
CPC .............. *G06T 7/11* (2017.01); *G06T 7/194* (2017.01); *G06T 7/73* (2017.01);
(Continued)

(58) Field of Classification Search
CPC . G06T 2207/10016; G06T 2207/20084; G06T 2207/20081; G06T 7/215; G06T 7/254; G06T 7/11; G06T 7/248; G06T 11/00; G06T 2207/10028; G06T 2207/30196; G06T 2207/30261; G06T 7/12; G06T 7/174; G06T 1/60; G06T 2207/10024; G06T 2207/20021; G06T 2207/20076; G06T 2207/20112; G06K 9/6215; G06K 9/00624; G06K 9/00744;
(Continued)

(56) References Cited

U.S. PATENT DOCUMENTS 10,176,388 B1\* 1/2019 Ghafarianzadeh ........................... G06K 9/00671
2017/0372479 A1\* 12/2017 Somanath ................. G06T 7/11
(Continued)

OTHER PUBLICATIONS

Abu-El-Haija, Sami, et al., "Youtube-8m: A large-scale video classification benchmark", 2016, 10 pages.
(Continued)

*Primary Examiner* — Golam Sorowar
(74) *Attorney, Agent, or Firm* — Kilpatrick Townsend & Stockton LLP

(57) ABSTRACT

A temporal object segmentation system determines a location of an object depicted in a video. In some cases, the temporal object segmentation system determines the object's location in a particular frame of the video based on information indicating a previous location of the object in a previous video frame. For example, an encoder neural network in the temporal object segmentation system extracts features describing image attributes of a video frame. A convolutional long-short term memory neural network determines the location of the object in the frame, based on the extracted image attributes and information indicating a previous location in a previous frame. A decoder neural network generates an image mask indicating the object's location in the frame. In some cases, a video editing system receives multiple generated masks for a video, and modifies one or more video frames based on the locations indicated by the masks.

17 Claims, 7 Drawing Sheets

(51) Int. Cl.
  *G06T 7/73* (2017.01)
  *G11B 27/031* (2006.01)
(52) U.S. Cl.
  CPC .............. *G06T 2207/10016* (2013.01); *G06T 2207/20081* (2013.01); *G11B 27/031* (2013.01)
(58) Field of Classification Search
  CPC .............. G06K 9/4628; G06K 9/6256; G06K 2009/4666; G06K 2209/21; G06K 9/00765; G06K 9/00771; G06K 9/00805; G06K 9/3241; G06K 9/46; G06K 9/4604; G06K 9/6267; G06K 9/627; G06K 2009/6213; G06K 2209/01; G06K 9/00335; G06K 9/00369
  See application file for complete search history.

(56) References Cited

U.S. PATENT DOCUMENTS

| | | | | |
|---|---|---|---|---|
| 2018/0232604 | A1* | 8/2018 | Seybold | ............... G06N 3/0454 |
| 2019/0147602 | A1* | 5/2019 | Tao | .................... G06K 9/00771 |
| | | | | 382/103 |
| 2019/0304506 | A1* | 10/2019 | Michaud | .............. G11B 27/031 |

OTHER PUBLICATIONS

Bengio, Yoshua., et al., "Learning Long-Term Dependencies with Gradient Descent is Difficult", IEEE Transactions on Neural Networks, vol. 5, No. 2, 1994, 35 pages.
Bengio, Samy, et al., "Scheduled sampling for sequence prediction with recurrent neural networks", Advances in Neural Information Processing Systems, 2015, pp. 1171-1179.
Brox, Thomas, et al., "Object Segmentation by Long Term Analysis of Point Trajectories", proceedings of European Conference on Computer Vision, Springer, 2010, pp. 282-295.
Caelles, S., et al., "One-Shot Video Object Segmentation", Computer Vision and Pattern Recognition, 2017, 10 pages.
Chen, Liang-Chieh, et al., "Deeplab: Semantic Image Segmentation with Deep Convolutional Nets, Atrous Convolution, and Fully Connected CRFs", IEEE T-PAMI, vol. 40, 2018, 14 pages.
Cheng, Jingchun, et al., "SegFlow: Joint Learning for Video Object Segmentation and Optical Flow", proceedings of IEEE International Conference on Computer Vision, 2017, 10 pages.
Cho, Kyunghyun, et al., "Learning Phrase Representations Using RNN Encoder-Decoder for Statistical Machine Translation", EMNLP 2014, pp. 1724-1734.
Donahue, Jeff, et al., "Long-term Recurrent Convolutional Networks for Visual Recognition and Description", proceedings of CVPR, 2015, 14 pages.
Faktor, Alon, et al., "Video Segmentation by Non-Local Consensus Voting", proceedings of British Machine Vision Conference, 2014, 1 page.
Fan, Qingnan, et al.,"JumpCut: Non-Successive Mask Transfer and Interpolation for Video Cutout", ACM Transactions on Graphics (TOG), vol. 34, No. 6, 2015, 10 pages.
Finn, Chelsea, et al., "Unsupervised Learning for Physical Interaction through Video Prediction", Advances in Neural Information Processing Systems, 2016, 9 pages.
Galasso, Fabio, et al., "A Unified Video Segmentation Benchmark: Annotation, Metrics and Analysis", proceedings of 2013 IEEE International Conference on Computer Vision, 2013, 8 pages.
Glorot, Xavier, et al., "Understanding the difficulty of training deep feedforward neural networks", proceedings of the Thirteenth International Conference on Artificial Intelligence and Statistics, 2010, pp. 249-256.
Hariharan, Bharath, et al., "Hypercolumns for Object Segmentation and Fine-Grained Localization" proceedings of the IEEE Conference on Computer Vision and Pattern Recognition, 2015, 49 pages.

Heilbron, Fabian Caba, et al., "ActivityNet: A Large-Scale Video Benchmark for Human Activity Understanding", 2015 IEEE Conference on Computer Vision and Pattern Recognition (CVPR), 2015, pp. 961-970.
Hochreiter, Sepp, et al., "Long Short-Term Memory", Neural Computation, vol. 9, No. 8, 1997, 32 pages.
Hu, Yuan-Ting, et al., "MaskRNN: Instance Level Video Object Segmentation", NIPS, 2017, 10 pages.
Ilg, Eddy, et al., "FlowNet 2.0: Evolution of Optical Flow Estimation with Deep Networks", Computer Vision and Pattern Recognition, 2017, 9 pages.
Jain, Suyog Dutt, et al., "FusionSeg: Learning to combine motion and appearance for fully automatic segmentation of generic objects in videos", proceedings of the IEEE Conference on Computer Vision and Pattern Recognition, Jul. 2017, 10 pages.
Jain, Suyog Dutt, et al., "Supervoxel-Consistent Foreground Propagation in Video", European Conference on Computer Vision, 2014, 16 pages.
Jampani, Varun, et al., "Video Propagation Networks", Computer Vision and Pattern Recognition, 2017, 11 pages.
Jozefowicz, Rafal, et al., "An Empirical Exploration of Recurrent Network Architectures", proceedings of International Conference on Machine Learning, 2015, 32 pages.
Kingma, Diederik, et al., "Adam: A Method for Stochastic Optimization", proceedings of 3rd International Conference for Learning Representations, San Diego, 2015, 15 pages.
Krähenbühl, Philip, et al., "Efficient Inference in Fully Connected CRFs With Gaussian Edge Potentials", Advances in Neural Information Processing Systems 24 (NIPS 2011), 2011, 40 pages.
Li, Fuxin, et al., "Video Segmentation by Tracking Many Figure-Ground Segments", proceedings of 2013 IEEE International Conference on Computer Vision, 2013, 8 pages.
Märki, Nicolas, et al., "Bilateral Space Video Segmentation", Computer Vision and Pattern Recognition, 2016, 9 pages.
Nagaraja, Naveen Shankar, et al., "Video Segmentation with Just a Few Strokes", 2015 IEEE International Conference on Computer Vision, 2015, pp. 3235-3243.
Nair, Vinod, et al., "Rectified Linear Units Improve Restricted Boltzmann Machines", proceedings of the 27th International Conference on Machine Learning, 2010, pp. 807-814.
Ochs, Peter, et al., "Segmentation of Moving Objects by Long Term Video Analysis", proceedings of the IEEE Transactions on Pattern Analysis and Machine Intelligence, vol. 36, No. 6, 2014, pp. 1187-1200.
Papazoglou, Anestis, et al., "Fast object segmentation in unconstrained video", proceedings of the 2013 IEEE International Conference on Computer Vision, 2013, pp. 1777-1784.
Perazzi, Federico, et al., "A Benchmark Dataset and Evaluation Methodology for Video Object Segmentation", Computer Vision and Pattern Recognition, 2016, 9 pages.
Perazzi, Federico, et al., "Learning Video Object Segmentation from Static Images", Computer Vision and Pattern Recognition, 2017, 10 pages.
Pineda, F.J., "Generalization of Back-Propagation to Recurrent Neural Networks", Physical Review Letters, vol. 59, No. 19, 1987, 10 pages.
Pont-Tuset, Jordi, et al., "The 2017 DAVIS Challenge on Video Object Segmentation", Computer Vision and Pattern Recognition, 2017, 6 pages.
Revaud, Jerome, et al., "Epicflow: Edge-Preserving Interpolation of Correspondences for Optical Flow", Computer Vision and Pattern Recognition, 2015, 12 pages.
Shelhamer, Evan, et al., "Fully Convolutional Networks for Semantic Segmentation", IEEE Transactions on Pattern Analysis and Machine Intelligence, vol. 39, No. 4, 2017, 10 pages.
Simonyan, Karen, et al., "Very Deep Convolutional Networks for Large-Scale Image Recognition", proceedings of International Conference on Learning Representations, 2014, 14 pages.
Srivastava, Nitish, et al., "Unsupervised Learning of Video Representations using LSTMs", proceedings of International Conference on Machine Learning, 2015, 12 pages.

(56) References Cited

OTHER PUBLICATIONS

Sutskever, Ilya, et al., "Sequence to Sequence Learning with Neural Networks", Advances in Neural Information Processing Systems, 2014, pp. 3104-3112.

Tokmakov, Pavel, et al., "Learning Motion Patterns in Videos", Computer Vision and Pattern Recognition, 2017, 9 pages.

Tokmakov, Pavel, et al., "Learning Video Object Segmentation with Visual Memory", proceedings of the IEEE International Conference on Computer Vision, 2017, 10 pages.

Tran, Du, et al., "Learning Spatiotemporal Features with 3D Convolutional Networks" proceedings of the IEEE International Conference on Computer Vision, 2015, 9 pages.

Tsai, Yi-Hsuan, et al., "Video Segmentation Via Object Flow", proceedings of the IEEE Conference on Computer Vision and Pattern Recognition, 2016, 10 pages.

Williams, Ronald J., et al., "A Learning Algorithm for Continually Running Fully Recurrent Neural Networks", Neural Computation, vol. 1, No. 2, 1989, 10 pages.

Xingjian, Shi, et al., "Convolutional LSTM Network: A Machine Learning Approach for Precipitation Nowcasting", Advances in Neural Information Processing Systems, 2015, 12 pages.

Xu, Huazhe, et al., "End-to-end Learning of Driving Models from Large-scale Video Datasets", Computer Vision and Pattern Recognition, 2017, 9 pages.

Yang, Linjie, et al., "Efficient Video Object Segmentation via Network Modulation", Computer Vision and Pattern Recognition, 2018, 9 pages.

\* cited by examiner

IMAGE OBJECT SEGMENTATION BASED ON TEMPORAL INFORMATION

TECHNICAL FIELD

This disclosure relates generally to the field of computer vision, and more specifically relates to using neural networks for segmentation of an object in a video.

BACKGROUND

Computing systems that implement computer vision and artificial intelligence use object segmentation techniques to determine the location of an object depicted in a video. For example, an interactive computing system (e.g., a robot, an information kiosk) uses object segmentation to determine when a human figure is in front of the interactive system. In addition, a video editing system uses object segmentation to modify the appearance of an object in an entertainment video, such as to modify the color of the object.

In some cases, object segmentation is used by computing systems to determine changes to the location of a particular object in a video. For example, the object may have more than one location, as the object (e.g., a person, a ball, a vehicle) moves around during the video. To determine the location of the object during the video, a computing system uses object segmentation techniques to determine what areas of the video images depict part of the object. Since a video can depict an object in many different perspectives (e.g. moving towards or away from the camera, passing behind other objects), accurate object segmentation is important to correctly determine the changing location of the object during the course of the video. If the computing system is capable of physical interactions, such as a robot, inaccurate object segmentation could endanger the user. Thus, it is beneficial to develop techniques to accurately perform object segmentation.

Existing object segmentation systems include single-image segmentation, in which each image is segmented independently. However, single-image segmentation systems do not accommodate continuity between images, such as continuity between a series of images in a video. Therefore, single-image segmentation systems fail to take advantage of temporal information when determining the location of an object in multiple video images. Additionally or alternatively, some existing object segmentation systems include pre-trained models, in which an annotated video is provided to the model in advance of performing the object segmentation. However, pre-trained models require training to identify each object in a given video (e.g., training to identify a person, additional training to identify a ball). Therefore, pre-trained models require additional computing resources, such as processing power and time, to perform object segmentation, particularly when identifying multiple objects in a given video.

It is beneficial to develop object segmentation techniques that determine object locations based on temporal information in a video. In addition, it is beneficial to develop object segmentation techniques that determine the location of an object in a given video without training on the given video.

SUMMARY

According to certain embodiments, the location of an object in multiple frames of a video is determined based on temporal object segmentation techniques. The temporal object segmentation system includes a mask extraction neural network. The mask extraction neural network includes an encoder subnetwork, a convolutional long-short term memory ("LSTM") subnetwork, and a decoder subnetwork. The encoder subnetwork is capable of extracting image features from image data. The convolutional LSTM subnetwork is capable of providing location features based on memory information, such as memory information describing a previous location. The decoder subnetwork is capable of determining outputs based on one or more of image features or location features. In some cases, the temporal object segmentation system includes a initializer neural network. The initializer neural network is capable of determining an initial location based on initial image data.

For example, the temporal object segmentation system receives a video depicting an object in multiple frames of the video and an initial mask that indicates a location of the object in a corresponding frame of the video. The initializer neural network receives the initial mask and the corresponding video frame, and extracts an initial location feature map based on the initial mask and the corresponding frame. The encoder subnetwork extracts image features from an additional frame of the video. The convolutional LSTM subnetwork receives the extracted image features and provides location features based on the initial location feature map. The decoder subnetwork produces an additional mask indicating the location of the object in the additional video frame, based on the location features. In some cases, the location features are provided to the LSTM subnetwork as an additional input, such as to determine the object location in a subsequent frame.

Additionally or alternatively, the encoder subnetwork receives the initial mask and the corresponding video frame, and extracts image features based on the initial mask and the corresponding frame. The convolutional LSTM subnetwork receives the extracted image features and provides location features, such as based on null memory information. The decoder subnetwork produces an additional mask indicating the location of the object in the corresponding video frame. In some cases, the location features are provided to the LSTM subnetwork as an additional input such as determining the object location in a subsequent frame.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
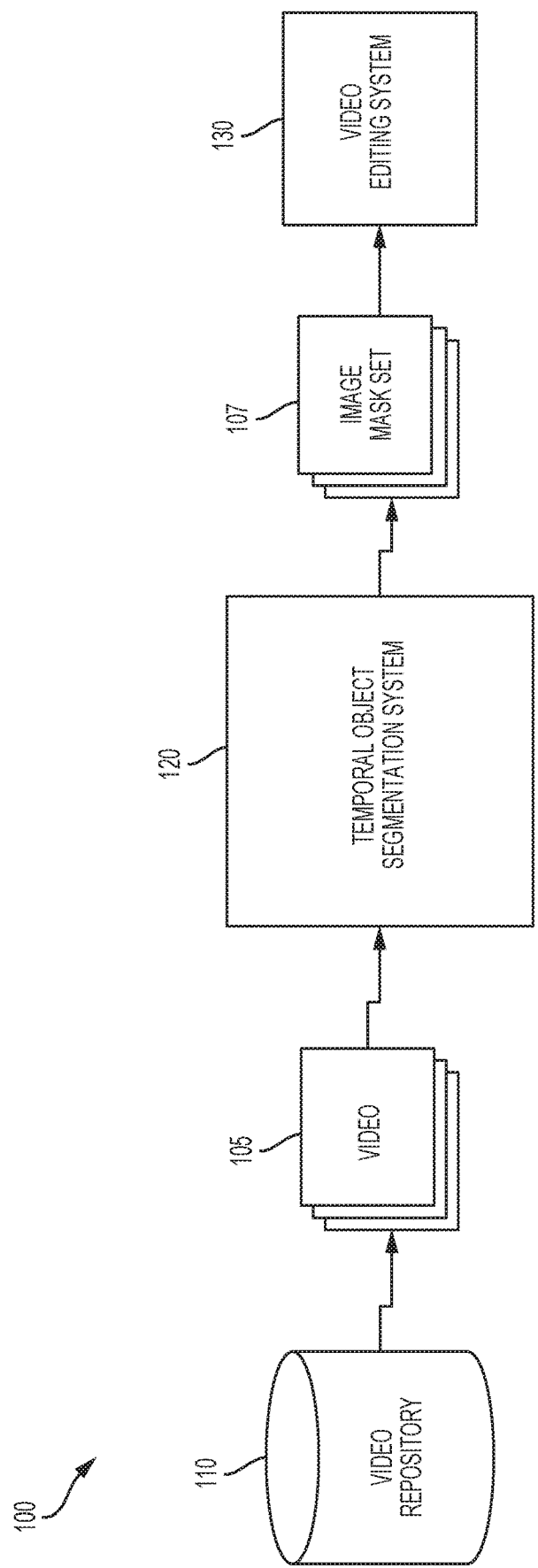
FIG. 1 is a block diagram depicting an example of a computing system capable of generating image masks indicating the location of an object depicted in a video, according to certain embodiments.

As discussed above, prior techniques for object segmentation do not provide accurate segmentation techniques based on temporal information. Certain embodiments described herein provide for accurate segmentation of an object in a video, based on temporal information included in the video.

The following examples are provided to introduce certain embodiments of the present disclosure. In this example, a video editing system receives a video file with multiple frames depicting an object in multiple locations, such as a person walking along a sidewalk. The video editing system also receives an initial image mask indicating a first location of the object in the video, where a first frame of the video corresponds to the initial mask.

In some embodiments, the video editing system applies an initializing subnetwork to extract, from the initial mask and the first video frame, a feature map indicating an initial location of the object. For example, the location feature map may indicate attributes for the person's image, such as size, shape, or color. The video editing system also applies a mask extraction subnetwork to the initial location feature map and a second video frame (e.g., a subsequent frame of the video), and thereby extracts image features from the second frame. For example, the image feature map may indicate attributes for various objects in the second frame, including the person's image, as well as the sidewalk or surrounding cars.

Continuing with this example, the video editing system generates a difference feature map indicating a second location of the object in the second video frame. The difference feature map is generated by applying a convolutional LSTM subnetwork to the extracted image features and the initial location feature map. For example, based on the person's size and shape indicated in the location feature map, and the various objects indicated by the image feature map, the difference feature map may indicate changes in person's image, such as a different size or shape. The video editing system also generates an additional mask indicating a second location of the object. Generating the additional mask includes applying a decoder subnetwork to the difference feature map. For example, the additional mask may include a black-and-white image that depicts the outline of the person at the second location, moving forward along the sidewalk. In some cases, the additional mask is included in a group of image masks corresponding to the multiple frames of the video. The video editing system uses the group of masks to modify the object as depicted in the set of frames. For example, the video editing system could create a modified video in which the person walking along the sidewalk is purple, such as by modifying the color of each video frame based on the person's location as indicated by the masks.

As used herein, the terms "object segmentation" and "segmentation" refer to techniques for generating data that indicates a location of an object. For example, object segmentation is performed on one or more images, to determine where is a location of a particular object depicted in the images. In some cases, object segmentation is performed on multiple sequential images, such as (without limitation) multiple images included in a video file. Additionally or alternatively, object segmentation is performed based on temporal information, such as time information represented by a sequence of images. Temporal object segmentation, for example, is performed by applying one or more neural networks to an image sequence, such that object segmentation of each frame is based on memory information indicating a previous frame.

As used herein, the term "location" refers to the apparent position of an object depicted in an image. For example, the object is depicted in the center of the image, a corner of the image, at an edge of the image, or any other suitable location. In some cases, the location of an object is relative to the apparent positions of other objects depicted in the image. For example, a first video may include one or more images depicting a sports car moving between trees. The first video may include multiple images that depict the sports car in the center of the images, but behind one or more of the trees. In some cases, a location includes an apparent pose of an object. For example, a second video may include one or more images depicting a person bending over to touch the ground. The second video may include multiple images that depict the person standing in a particular place, but changing pose from standing upright to bending over. In some cases, a location includes an apparent size of an object. For example, a third video may include one or more images depicting a ball moving towards the camera. The third video may include multiple images that depict the ball in the center of the images, but increasing in size (or apparent size) as the ball moves towards the camera.

As used herein, the term "image" refers to a digital image depicting a graphical representation of subject matter. For example, an image uses pixels or vector-based graphics to represent a depiction of one or more objects. In some embodiments, the image is included in a collection of images, such as a frame within a video. Additionally or alternatively, a video file includes one or more images, such as video frames (e.g. "frames"). In some cases, multiple images have a sequence, such as sequential frames included in a video.

As used herein, the terms "mask" and "image mask" refer to a representation of an object depicted in an image. For example, an image mask describes the object's location (e.g., position, size, shape) in the image. In some embodiments, an image mask is a digital graphical image, such as a black-and-white image comprising pixels. Additionally or alternatively, the image mask includes white pixels indicating the location of the object in the image, and black pixels indicating other areas of the image (e.g., where the object is not located).

As used herein, the term "neural network" refers to refers to one or more computer-implemented networks capable of being trained to achieve a goal. Unless otherwise indicated, references herein to a neural network include one neural network or multiple interrelated neural networks. For example, a neural network includes one or more subnetworks or components, and a subnetwork may also include one or more subnetworks or components. In some cases, one or more neural networks are trained together.

As used herein, the term "attribute" refers to a graphical quality of an image. In some cases, attributes include portions of the image, such as groups of pixels. Additionally or alternatively, attributes include colors, brightness, shapes, or other graphical qualities that are visible in an image. In some embodiments, an attribute includes location attributes, such as a shape, position, or any other attribute indicating the location of an object in the image. In some cases, a location attribute and an image attribute describe a same graphical quality (e.g., a shape).

As used herein, the term "feature" refers to a representation of one or more attributes of an image, such as a location attribute or an image attribute. A feature includes, for example, a value, equation, or data structure that represents an attribute. In some embodiments, features include (or include representations of) edges, shapes, colors, gradients, transformations, filters, semantic content (e.g., subject matter of the image), In some cases, features include data that is not intended for human interpretation, such as a data structure or a mathematical description of an attribute.

As used herein, the term "feature map" refers to a data structure that includes one or more features. For example, a feature map includes a data structure having one or more dimensions, which is capable of storing one or more features. In some cases, a feature map has one or more channels, such as multiple channels that are capable of respectively storing one or more features.

Referring now to the drawings, FIG. 1 is a block diagram depicting an example of a computing system 100 in which one or more image masks are generated to indicate the location of an object depicted in a video. In the computing system 100, a temporal object segmentation system 120 receives a video 105. The video 105 includes one or more images depicting a particular object, such as multiple frames in the video. The particular object is included in the subject matter depicted by the video, such as a vehicle, a person's clothing, a background of the video (e.g., sky, water), or any other suitable portion of the subject matter. In some cases, the video 105 is provided by a repository 110, such as a database, virtual storage system (e.g., cloud-based storage), or other suitable storage system. Additionally or alternatively, the video 105 is provided by an image sensor system, such as a camera.

In the computing system 100, the temporal object segmentation system 120 generates one or more masks that indicate a location of the object. The temporal object segmentation system 120 stores the generated masks, such as in a set of image masks 107. Each generated mask corresponds to a particular image included in the video 105. For example, if the video 105 includes fifteen frames depicting the object, the temporal object segmentation system 120 generates fifteen masks respectively corresponding to each of the frames. Additionally or alternatively, each of the generated masks indicates a respective location of the object in the corresponding frame. For example, if the fifteen frames depict the object moving from left to right (e.g. relative to the camera's field of vision), the fifteen corresponding masks indicate the relative positions of the object moving from left to right.

In the computing system 100, the temporal object segmentation system 120 provides the image mask set 107 to a video editing system 130. The video editing system 130 is capable of using the image mask set 107 to, for example, modify an appearance of each video frame based on the location of the object in the video frame. For example (and without limitation), the video editing system 130 modifies a color of the object in each frame of the video. In FIG. 1, the temporal object segmentation system 120 provides the image mask set 107 to the video editing system 130, but other configurations are possible. For example, the temporal object segmentation system 120 may provide the image mask set 107 to a computer vision system (e.g., a robot, a game entertainment system), to a security computing system, to an augmented reality computing system or to any other suitable computing system capable of analyzing or performing other functions based on the image mask set 107, including analysis based on a stored (e.g., saved) video or analysis based on an active (e.g., live, real-time) video feed.

Figure 2:
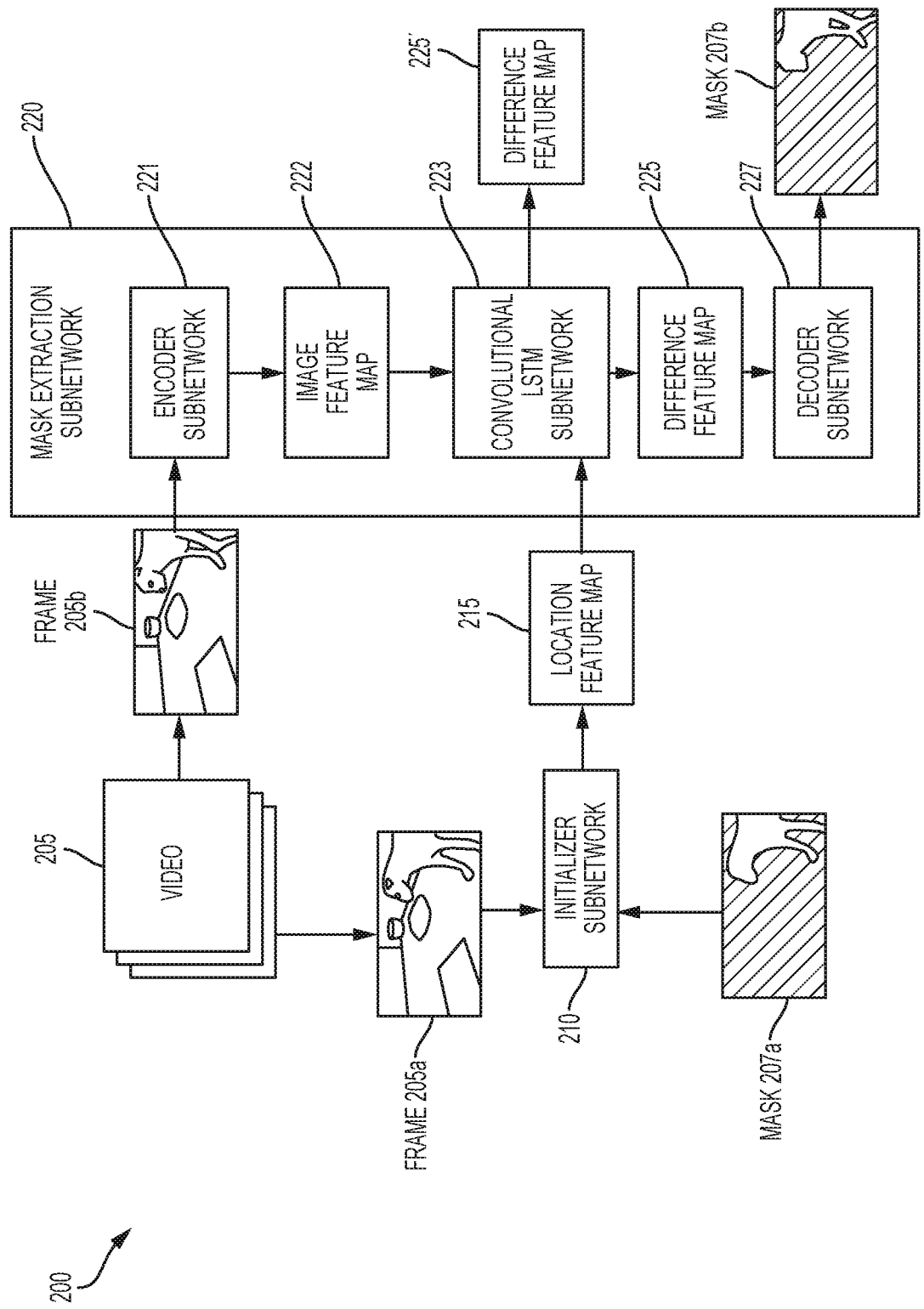
FIG. 2 is a block diagram depicting an example of a temporal object segmentation system in which an initial mask is received by an initializer subnetwork, according to certain embodiments.

FIG. 2 includes a block diagram depicting an example of a temporal object segmentation system 200. The temporal object segmentation system 200 includes one or more component neural networks, including an initializer subnetwork 210 and a mask extraction subnetwork 220. Additionally or alternatively, the mask extraction subnetwork 220 includes component neural networks, including an encoder subnetwork 221, a convolutional LSTM subnetwork 223, and a decoder subnetwork 227. In some embodiments, the convolutional LSTM subnetwork 223 is arranged between the encoder subnetwork 221 and the decoder subnetwork 227. In the temporal object segmentation system 200, the convolutional LSTM subnetwork 223 is capable of receiving multiple inputs, including an input from the initializer subnetwork 210 and the encoder subnetwork 221. Additionally or alternatively, the convolutional LSTM subnetwork 223 is capable of providing multiple outputs, including an output to the decoder subnetwork 227, and an additional output, such as memory information. In some cases, the convolutional LSTM subnetwork 223 is capable of receiving an input from an additional convolutional LSTM subnetwork, or from itself. For example, the convolutional LSTM subnetwork 223 may receive (or provide) memory information, such as memory information that is received from a previous iteration of the convolutional LSTM subnetwork 223, or provided to a subsequent iteration of the convolutional LSTM subnetwork 223.

In some embodiments, the temporal object segmentation system 200 includes (or receives) a video 205. Additionally or alternatively, the temporal object segmentation system 200 includes (or receives) a mask 207a. The video 205 includes one or more frames that depict a particular object, such as a frame 205a and a frame 205b which each depict a dog. In some cases, each of the frames in the video 205 is associated with a timestamp, such as a timestamp t. For example, frame 205a is associated with a timestamp t=0 and frame 205b is associated with a timestamp t=1. Additionally or alternatively, the mask 207a is associated with a timestamp, such as a timestamp t. In some cases, the mask 207a has a timestamp corresponding to a frame of the video 205. For example, the mask 207a has a timestamp t=0, corresponding to the frame 205a.

The mask 207a indicates a location of the object in a corresponding frame, such as the corresponding frame 205a. In some cases, the mask 207a indicates an initial location of the object in the video 205, such as an initial location of a dog when the dog becomes visible at frame 205a in the video 205. One of ordinary skill will understand that the frame corresponding to the initial location of an object may (but need not) occur at the beginning of the video. For example, if the video 205 depicts other subject matter during the beginning of the video, and the dog becomes visible halfway through the video, the frame 205a and the mask 207*a* may correspond to a point in time halfway through the video, when the dog becomes visible.

In the temporal object segmentation system 200, the initializer subnetwork 210 receives the mask 207*a* and the corresponding frame 205*a*. In some cases, the initializer subnetwork 210 receives a combination of the frame 205*a* and the mask 207*a*, such as a concatenation. The initializer subnetwork 210 is capable of extracting, from the frame 205*a* and based on the mask 207*a*, one or more location features that indicate the location of the object in the frame 205*a*. The location features may include attributes of the frame 205*a*, such as horizontal or vertical edges, colors, color gradients, semantic content, blur (e.g., changes in camera focus), or any other suitable image attribute. Additionally or alternatively, the initializer subnetwork 210 is capable of generating a location feature map 215, based on the mask 207*a* and the corresponding frame 205*a*. In some cases, the location feature map 215 indicates the initial location of the object in the frame 205*a*. For example, the location feature map 215 includes the one or more location features extracted by the initializer subnetwork 210.

In the temporal object segmentation system 200, the mask extraction subnetwork 220 receives the location feature map 215 and an additional frame from the video 205, such as the frame 205*b*. In the mask extraction subnetwork 220, the encoder subnetwork 221 receives the frame 205*b*. Based on analysis of the frame 205*b*, the encoder subnetwork 221 extracts one or more image features from the frame 205*b*. The image features may include attributes of the frame 205*b*, such as any suitable image attribute. Additionally or alternatively, the encoder subnetwork 221 generates an image feature map 222, based on the frame 205*b*. In some cases, the image feature map 222 indicates the attributes of the frame 205*b*. For example, the image feature map 222 includes the one or more image features extracted by the encoder subnetwork 221.

In some embodiments, the convolutional LSTM subnetwork 223 receives the location feature map 215 and the image feature map 222. In some cases, the convolutional LSTM subnetwork 223 receives the image feature map 222 as an input, and receives the location feature map 215 as a memory input. Based on analysis of the location feature map 215 and the image feature map 222, the convolutional LSTM subnetwork 223 generates a difference feature map 225 indicating an additional location of the object, such as depicted in the additional frame 205*b*. For example, the difference feature map 225 includes one or more image features that indicate the additional location of the object. In some cases, the convolutional LSTM subnetwork 223 uses some or all of the information in the location feature map 215 as memory information (e.g., information indicating a previous location of the object). Additionally or alternatively, the convolutional LSTM subnetwork 223 uses attributes indicated by the image feature map 222 as image information (e.g., information indicating content of the present image). In some cases, by determining the additional location of the object based on memory information indicating a previous location of the object, the temporal object segmentation system 200 provides location information for the object that is more accurate, as compared to determining a location based on image information without memory information.

In the mask extraction subnetwork 220, the decoder subnetwork 227 receives the difference feature map 225. Based on analysis of the difference feature map 225, the decoder subnetwork 227 generates an additional mask 207*b*. For example, based on the one or more image features included in the difference feature map 225, the mask 207*b* indicates the additional location of the object in the frame 205*b*. Additionally or alternatively, the decoder subnetwork 227 receives the image feature map 222, and generates the additional mask 207*b* based on a combination of the difference feature map 225 and the image feature map 222. In some cases, the mask 207*b* has a timestamp t=1, corresponding to the timestamp of frame 205*b*.

In some embodiments, the mask extraction subnetwork 220 provides the mask 207*b*. For example, the mask 207*b* may be included in an image mask set, such as the image mask set 107 described in regards to FIG. 1. In some cases, the mask 207*b* is provided to a computing system capable of analyzing or otherwise using the location information indicated by the mask 207*b*. For example, a video editing system (such as the video editing system 130 described in regards to FIG. 1) may modify the video 205 based on the mask 207*b*.

Additionally or alternatively, the mask extraction subnetwork 220 provides a modified difference feature map 225'. The modified difference feature map 225' includes, for example, the image features that indicate the additional location of the object. In some cases, the modified difference feature map 225' also includes memory information indicating the additional location. For example, an additional mask extraction subnetwork (or an additional iteration of the mask extraction subnetwork 220) determines a further location of the object in a further frame (e.g., a frame subsequent to the frame 205*b*). Additionally or alternatively, the additional mask extraction subnetwork (or the additional iteration of the subnetwork 220) determines the further location based on memory information included in the modified difference feature map 225'. In some embodiments, for each frame in a sequence of video frames, one or more mask extraction subnetworks determines the location of the object in each frame based on memory information indicating the location of the object in a previous frame. By using the memory information indicating the location in the previous frame, the mask extraction subnetwork(s) provides object location information (e.g., indicated by one or more masks) that is based on temporal information included in the video, such as a temporal sequence of frames.

Figure 3:
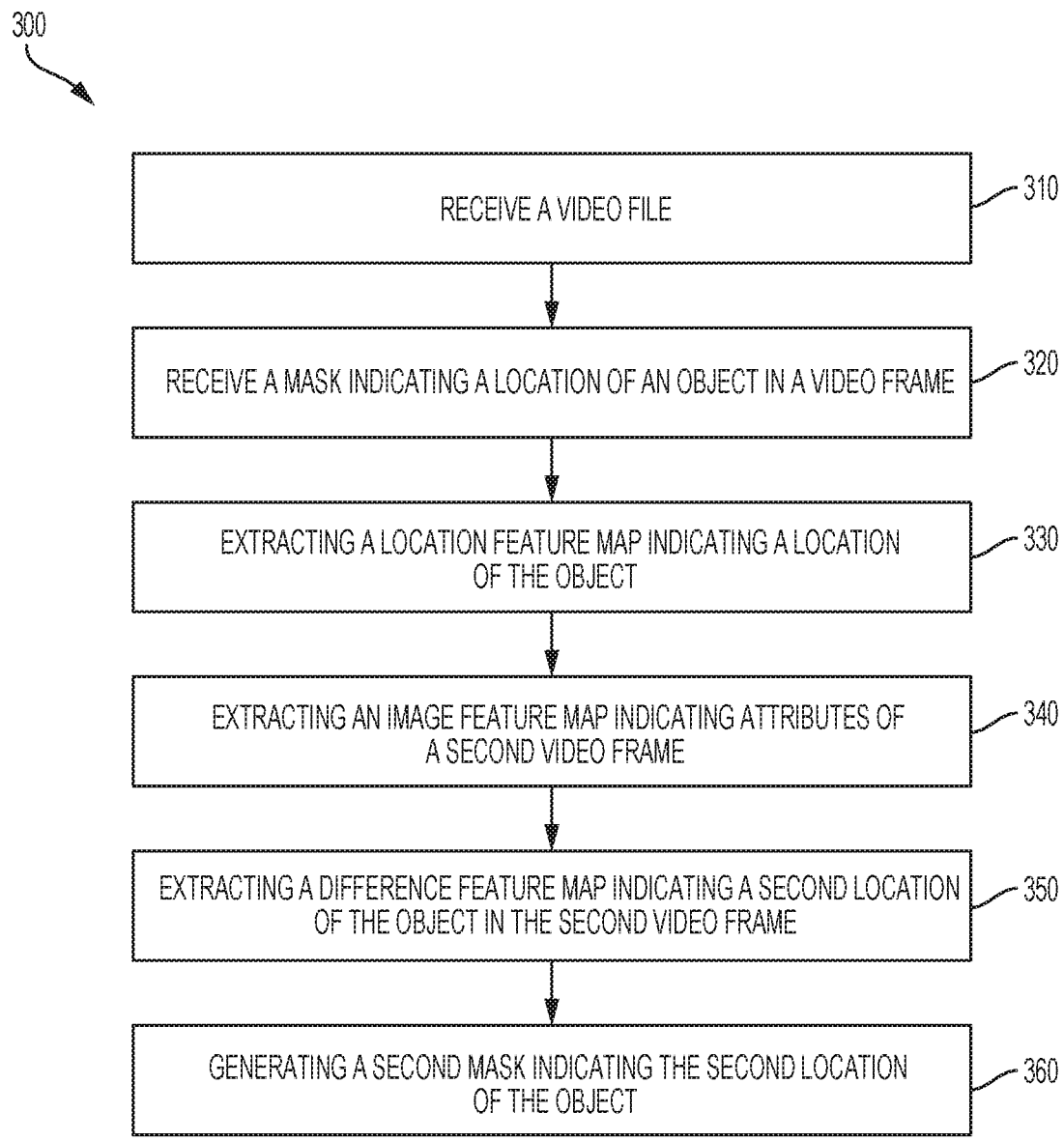
FIG. 3 is a flow chart depicting an example of a process for generating one or more masks indicating the location of an object in the video, based on an initial mask received by an initializer subnetwork, according to certain embodiments.

FIG. 3 is a flow chart depicting an example of a process 300 for generating one or more masks indicating the location of an object in the video. In some embodiments, such as described in regards to FIGS. 1-2, a computing device executing a temporal object segmentation system with an initializer neural network and a mask extraction neural network implements operations described in FIG. 3, by executing suitable program code. For illustrative purposes the process 300 is described with reference to the examples depicted in FIGS. 1-2. Other implementations, however, are possible.

At block 310, the process 300 involves receiving a video file. In some cases, the video file, such as the video file 205, is received from a video repository, such as the video repository 110. Additionally or alternatively, the video file is received from an image sensor system, such as a camera or light sensor. In some embodiments, the video file includes multiple frames depicting an object. For example, the video file includes a sequence of frames in which the object is at least partially visible. In some cases, the sequence of frames depicting the object is not contiguous (e.g., if the object passes behind an obstruction and then reappears, the video file may include some frames in which the object is not visible).

At block 320, the process 300 involves receiving an image mask indicating a location of the object. In some cases, the image mask is an initial image mask that indicates the initial location of the object. Additionally or alternatively, the image mask corresponds to a frame of the video file, such as an initial frame in which the object is visible. In some cases, the image mask, such as the mask 207a, is received with the video. For example, the mask and the video are received from a video repository. Additionally or alternatively, the mask is received from an additional computing system. For example, and not by way of limitation, the mask is received from a personal computing system associated with an end user, such as a graphic design artist. The end user, for example, provides the mask via a user interface included in the personal computing system. Additionally or alternatively, the end user provides the mask by indicating the initial location of the object in the corresponding initial video frame.

At block 330, the process 300 involves extracting a location feature map indicating the location of the object. In some cases, the location feature map is based on one or more of the mask or a corresponding frame of the video file. For example, the location feature map is extracted by applying an initializer subnetwork, such as the initializer subnetwork 210, to the mask and the corresponding frame, such as the mask 207a and the corresponding frame 205a. In some embodiments, the location feature map includes one or more location features that include extracted image features (e.g., extracted from the video frame) that are correlated with the object location indicated by the mask. For example, based on the coordinates of pixels associated with the object location indicated by the mask, extracted image features that are associated with similar pixel coordinates in the video frame are correlated with the object location. In some cases, the location feature map is included in a hidden state, such as a hidden state generated by the initializer subnetwork. Additionally or alternatively, the location feature map includes (or otherwise indicates) memory information indicating the location of the object.

At block 340, the process 300 involves extracting an image feature map indicating attributes of an additional frame in the video, such as an additional video frame in which the object is visible. In some embodiments, the image feature map is extracted by applying an encoder subnetwork, such as the encoder subnetwork 221, to the additional video frame, such as the video frame 205b. Additionally or alternatively, the image feature map includes one or more image features indicating attributes of the additional video frame.

At block 350, the process 300 involves extracting a difference feature map indicating an additional location of the object. In some cases, the difference feature map is based on one or more of the location feature map, such as described in regards to block 330, and the image feature map, such as described in regards to block 340. Additionally or alternatively, the difference feature map is extracted by applying a convolutional LSTM subnetwork, such as the convolutional LSTM subnetwork 223, to the location feature map and the image feature map, such as the location feature map 215 and the image feature map 222. For example, the convolutional LSTM subnetwork determines image features, from the image feature map, that indicate the additional object location, based on memory information indicated by the location feature map. In some cases, the convolutional LSTM subnetwork receives the location feature map as a hidden state. Additionally or alternatively, the extracted difference feature map includes one or more image features (e.g., from the extracted image feature map) that are correlated with the additional location of the object.

At block 360, the process 300 involves generating an additional mask, indicating the additional location of the object. In some embodiments, the additional mask is generated by applying a decoder subnetwork, such as the decoder subnetwork 227, to the difference feature map, such as the difference feature map 225. In some cases, the additional mask is a digital graphical image including one or more regions of pixels indicating the location of the object in the frame (e.g., representing the object with white pixels), and one or more regions of pixels indicating other areas of the frame (e.g., representing other areas with black pixels). Additionally or alternatively, the additional mask is provided to an additional computing system. For example, the additional mask is provided to the video editing system 130, such as in the image mask set 107.

In some embodiments, operations related to one or more of the blocks 340, 350, or 360 are repeated for additional video frames depicting the object. For example, for each additional video frame included in the received video, the encoder subnetwork extracts an additional image feature map based on each respective video frame. Additionally or alternatively, the convolutional LSTM subnetwork extracts an additional difference feature map based on the image feature map received from the encoder subnetwork and memory information indicating a previous location of the object in a previous frame. In some cases, the convolutional LSTM subnetwork receives the memory information, such as in the modified difference feature map 225', from a previous iteration of the convolutional LSTM subnetwork (or from an additional convolutional LSTM subnetwork). Additionally or alternatively, for each additional video frame included in the received video, the decoder subnetwork generates an additional image mask based on the additional difference feature map. In some embodiments, operations related to process 300 are used to generate an image mask indicating the object location for each video frame in the received video.

Figure 4:
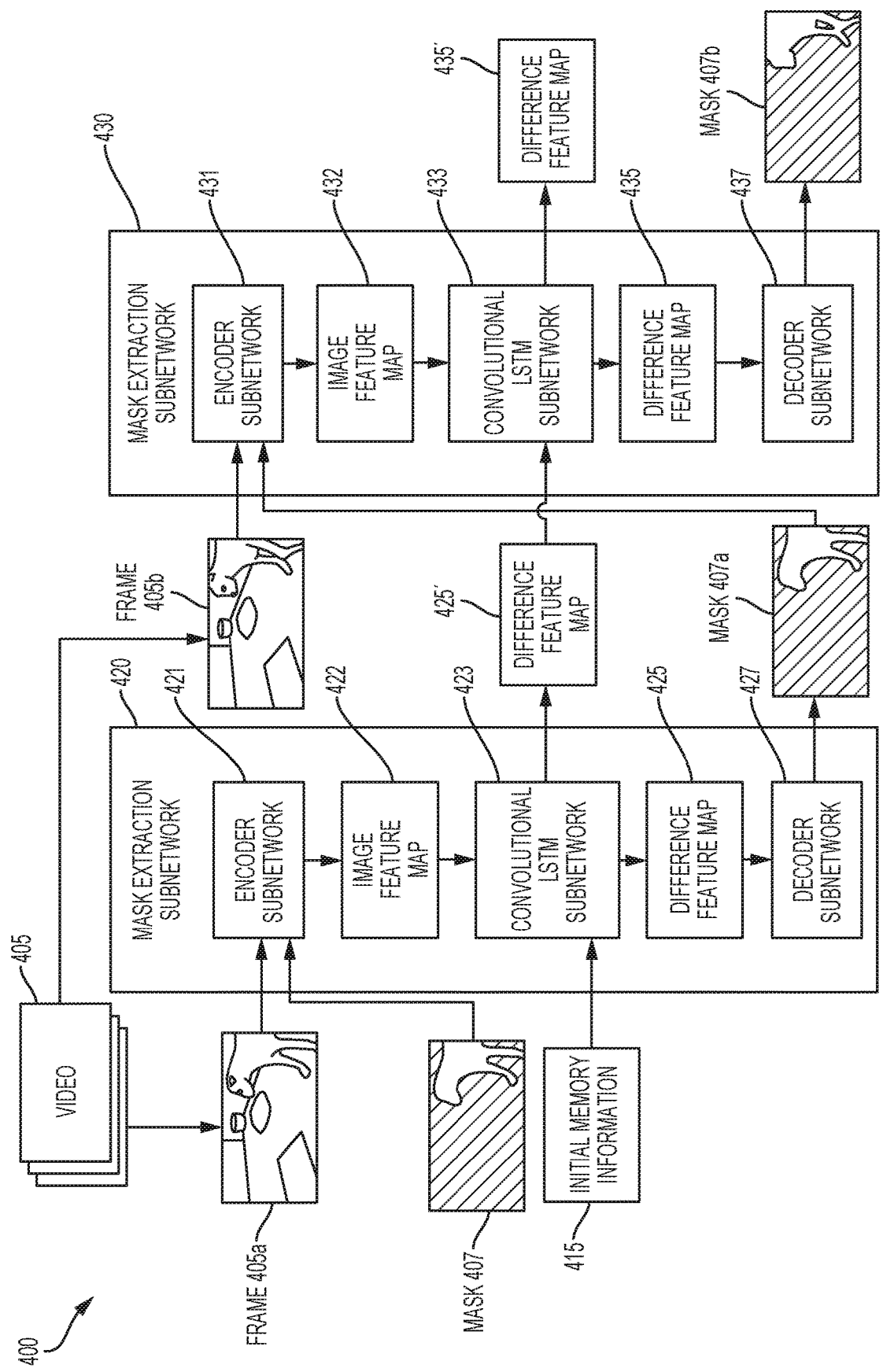
FIG. 4 is a block diagram depicting an example of a temporal object segmentation system in which an initial mask is received by an encoder subnetwork, according to certain embodiments.

FIG. 4 includes a block diagram depicting an example of the temporal object segmentation system 400. The temporal object segmentation system 400 includes (at least) a mask extraction subnetwork 420, which includes an encoder subnetwork 421, a convolutional LSTM subnetwork 423, and a decoder subnetwork 427. Additionally or alternatively, the temporal object segmentation system 400 includes a mask extraction subnetwork 430, which includes encoder subnetwork 431, convolutional LSTM subnetwork 433, and a decoder subnetwork 437. The mask extraction subnetwork 430 may comprise a subsequent iteration of the mask extraction subnetwork 420 (e.g., the subnetwork 420 at a subsequent point in time), or an instance of another mask extraction subnetwork. In the embodiment depicted in FIG. 4, the temporal object segmentation system 400 does not include an initializer subnetwork.

In the mask extraction subnetwork 420, the convolutional LSTM subnetwork 423 is arranged between the encoder subnetwork 421 and the decoder subnetwork 427. In some embodiments, the encoder subnetwork 421 and the convolutional LSTM subnetwork 423 are capable of receiving multiple inputs. For example, the encoder subnetwork 421 is capable of receiving one or more of a video frame or a mask as inputs. Additionally or alternatively, convolutional LSTM subnetwork 423 is capable of receiving one or more of memory information or a feature map as inputs. In the mask extraction subnetwork 430, the convolutional LSTM subnetwork 433 is arranged between the encoder subnetwork 431 and the decoder subnetwork 437. In some embodiments, the encoder subnetwork 431 and the convolutional LSTM subnetwork 433 are capable of receiving multiple inputs. For example, the encoder subnetwork 431 is capable of receiving one or more of a video frame or a mask as inputs. Additionally or alternatively, convolutional LSTM subnetwork 433 is capable of receiving one or more of memory information or a feature map as inputs.

In some cases, the convolutional LSTM subnetworks 423 and 433 are capable of receiving (or providing) an input from (or to) an additional convolutional LSTM subnetwork. For example, the convolutional LSTM subnetwork 423 is capable of providing memory information to the convolutional LSTM subnetwork 433. Additionally or alternatively, the convolutional LSTM subnetwork 423 is capable of receiving memory information, including null memory information (e.g., memory information that contains no data).

In some embodiments, the temporal object segmentation system 400 includes (or receives) a video 405. The video 405 includes one or more frames that depict a particular object, such as a frame 405a and a frame 405b which each depict a dog. Additionally or alternatively, the temporal object segmentation system 400 includes (or receives) a mask 407a. The mask 407a indicates a location of the object in a corresponding frame, such as the corresponding frame 405a. In some cases, the mask 407 is an initializing mask that indicates an initial location of the object in the video 405. In some cases, each of the frames in the video 405 is associated with a timestamp, such as a timestamp t. For example, frame 405a is associated with a timestamp t=0 and frame 405b is associated with a timestamp t=1. Additionally or alternatively, the mask 407 is associated with a timestamp, such as a timestamp t. In some cases, the mask 407 has a timestamp corresponding to a frame of the video 405.

In the mask extraction subnetwork 420, the encoder subnetwork 421 receives the mask 407 and the corresponding frame 405a. In some cases, encoder subnetwork 421 receives a combination of the frame 405a and the mask 407, such as a concatenation. The encoder subnetwork 421 is capable of extracting, from the frame 405a and based on the mask 407, first image features from the frame 405a. The first image features include attributes of the frame 405a, such as any suitable image attribute. In some cases, the first image features are extracted based on the initial location of the object depicted in the mask 407. Additionally or alternatively, the encoder subnetwork 421 is capable of extracting, from the mask 407, first location features from the mask 407. The first location features include attributes of the mask 407, such as any suitable image attribute, that indicate the initial location of the object in the mask 407.

In some cases, the encoder subnetwork 421 is capable of generating an image feature map 422, based on the mask 407 and the corresponding frame 405a. For example, the image feature map 422 includes the one or more of the first image features extracted by the encoder subnetwork 421. Additionally or alternatively, the image feature map 422 includes the one or more of the first location features extracted by the encoder subnetwork 421. In some cases, one or both of the first image features or the first location features indicate the initial location of the object.

In the temporal object segmentation system 400, the convolutional LSTM subnetwork 423 receives the image feature map 422 and the initial memory information 415. In some cases, the convolutional LSTM subnetwork 423 receives the image feature map 422 as an input, and receives the initial memory information 415 as a memory input. Additionally or alternatively, the initial memory information 415 includes null information (e.g., a data structure that contains no data, a data structure that contains only zeros). Based on analysis of the image feature map 422 and the initial memory information 415, the convolutional LSTM subnetwork 423 generates a difference feature map 425 indicating a first location of the object in the frame 405a. For example, the difference feature map 425 includes one or more of the first image features that indicate the first location. In some cases, such as if the initial memory information 415 includes null information, the first location indicated by the difference feature map 425 is identical to (or similar to) the initial location indicated by the mask 407.

In the mask extraction subnetwork 420, the decoder subnetwork 427 receives the difference feature map 425. Based on analysis of the difference feature map 425, the decoder subnetwork 427 generates a first mask 407a, indicating the first location of the object in the frame 405a. Additionally or alternatively, the decoder subnetwork 427 receives the image feature map 422, and generates the first mask 407a based on a combination of the difference feature map 425 and the image feature map 422. In some cases, the first mask 407a has a timestamp corresponding to the frame 405a, such as a timestamp t=0. In some embodiments, such as if the initial memory information 415 includes null information, the first mask 407a is identical to (or similar to) the initializing mask 407.

In some embodiments, the mask extraction subnetwork 420 provides a modified difference feature map 425'. The modified difference feature map 425' includes, for example, the first image features that indicate the first location of the object. In some cases, the modified difference feature map 425' also includes memory information indicating the first location.

In the temporal object segmentation system 400, the mask extraction subnetwork 430 receives the additional frame 405b, the modified difference feature map 425', and the first mask 407a. The encoder subnetwork 431 is capable of extracting, from the frame 405b based on the first mask 407a, second image features from the frame 405b. The second image features include attributes of the frame 405b, such as any suitable image attribute. In some cases, the second image features are extracted based on first location of the object indicated in the first mask 407a. Additionally or alternatively, the encoder subnetwork 431 is capable of extracting, from the mask 407a, second location features from the mask 407a. The second location features include attributes of the mask 407a, such as any suitable image attribute, that indicate the first location of the object in the mask 407a. Additionally or alternatively, the encoder network 431 is capable of generating an image feature map 432, based on the first mask 407a and the additional frame 405b. For example, the image feature map 432 includes one or more of the second image features or the second location features extracted by the encoder subnetwork 431.

In the mask extraction subnetwork 430, the convolutional LSTM subnetwork 433 receives the image feature map 432 and the modified difference feature map 425'. In some cases, the convolutional LSTM subnetwork 433 receives the image feature map 432 as an input, and receives the modified difference feature map 425' as a memory input. Based on analysis of the image feature map 432 and the modified difference feature map 425', the convolutional LSTM subnetwork 433 generates an additional difference feature map 435 indicating a second location of the object in the frame 405b. In some cases, the convolutional LSTM subnetwork 433 uses some or all of the information in the modified difference feature map 425' as memory information.

In the mask extraction subnetwork 430, the decoder subnetwork 437 receives the difference feature map 435. Based on analysis of the difference feature map 435, the decoder subnetwork 437 generates a second mask 407b, indicating the second location of the object in the frame 405b. In some cases, the second mask 407b has a timestamp corresponding to the frame 405b, such as a timestamp t=1.

In some embodiments, the mask extraction subnetwork 430 provides a modified difference feature map 435' the modified difference feature map 435' includes, for example, the second image features indicate the second location of the object in some cases, the modified difference feature map 435' also includes memory information indicating the second location. In some cases, the modified difference feature map 435' is received by an additional mask extraction subnetwork (or an additional duration of the subnetworks 420 or 430), and the additional mask extraction subnetwork determines an additional object location corresponding to an additional video frame based on the memory information included in the modified difference feature map 435'.

In some embodiments, a temporal object segmentation system that includes an initializer subnetwork (such as the temporal object segmentation system 200, as described in regards to FIG. 2) is trained in less time as compared to a temporal object segmentation system that does not include an initializer subnetwork (such as the temporal segmentation system 400). For example, an encoder subnetwork that receives video frames (such as the encoder subnetwork 221) is capable of being trained in relatively less time than an encoder subnetwork that receives a combination of video frames and image masks (such as the encoder subnetwork 421). In some cases, the temporal object segmentation system including the initializer subnetwork experiences lower rates of error (e.g., lower "drift" when determining error) as compared to the temporal object segmentation system that omits the initializer subnetwork.

In some embodiments, a temporal object segmentation system that does not include an initializer subnetwork (such as the temporal object segmentation system 400) identifies object locations with higher accuracy as compared to a temporal object segmentation system that includes an initializer subnetwork (such as the temporal segmentation system 200). For example, an encoder subnetwork that receives a combination of video frames and image masks (such as the encoder subnetwork 421) extracts a greater quantity or more accurate image features in the area around the location indicated by the mask, as compared to an encoder subnetwork that receives video frames without image masks (such as the encoder subnetwork 221). In some cases, the temporal object segmentation system that omits the initializer subnetwork more accurately identifies object locations, especially locations of small objects, as compared to the temporal object segmentation system that includes the initializer subnetwork.

Figure 5:
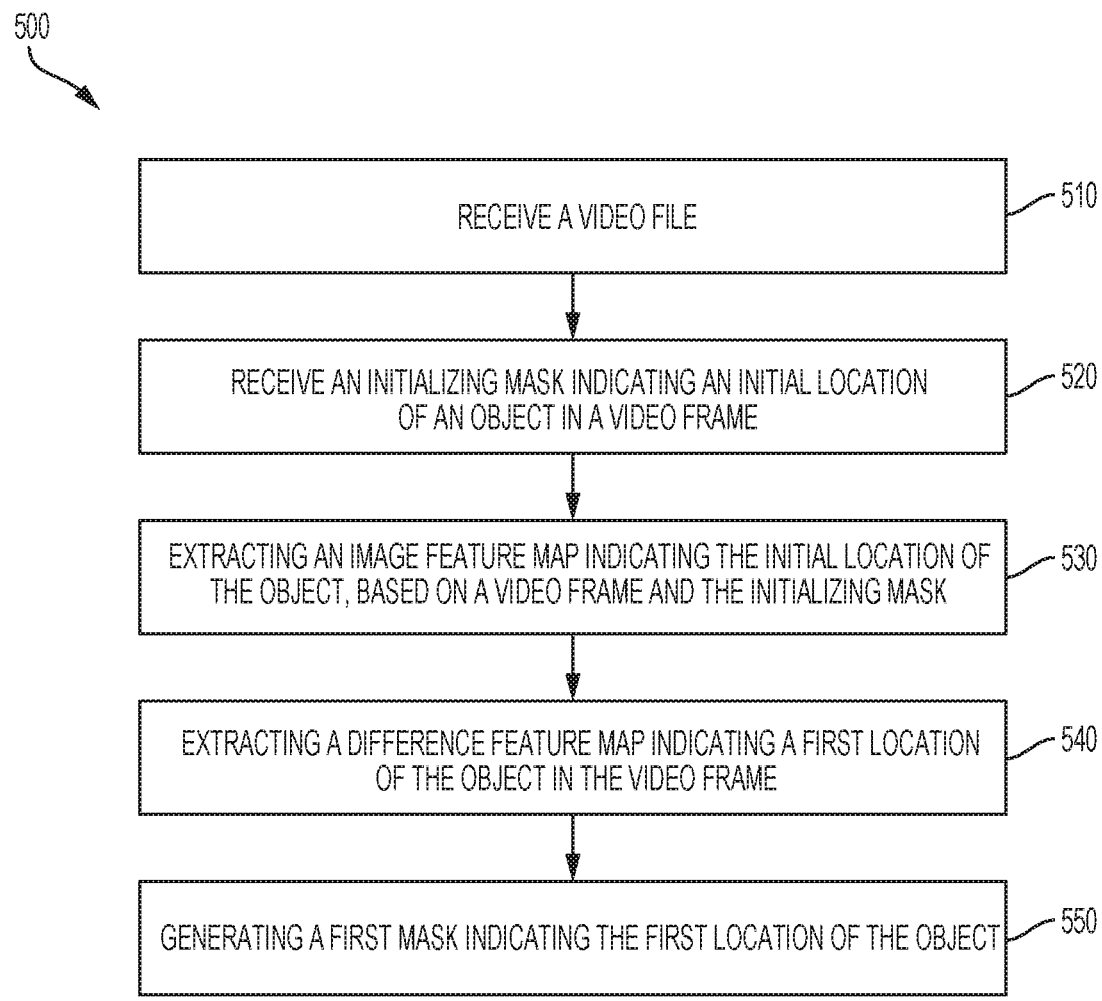
FIG. 5 is a flow chart depicting an example of a process for generating one or more masks indicating the location of an object in the video, based on an initial mask received by an encoder subnetwork, according to certain embodiments.

FIG. 5 is a flow chart depicting an example of a process 500 for generating one or more masks indicating the location of an object in the video. In some embodiments, such as described in regards to FIGS. 1-4, a computing device executing a temporal object segmentation system with a mask extraction neural network implements operations described in FIG. 5, by executing suitable program code. For illustrative purposes the process 500 is described with reference to the examples depicted in FIGS. 1-4. Other implementations, however, are possible.

At block 510, the process 500 involves receiving a video file. In some cases, the video file, such as the video file 405, is received from a video repository, such as the video repository 110. Additionally or alternatively, the video file is received from an image sensor system, such as a camera or light sensor. In some embodiments, the video file includes multiple frames depicting an object. For example, the video file includes a sequence of frames in which the object is at least partially visible. In some cases, the sequence of frames depicting the object is not contiguous.

At block 520, the process 500 involves receiving an image mask indicating a location of the object. In some cases, the image mask is an initializing image mask that indicates the initial location of the object. Additionally or alternatively, the image mask corresponds to a frame of the video file, such as an initial frame in which the object is visible. In some cases, the image mask, such as the mask 407, is received with the video. For example, the mask and the video are received from a video repository. Additionally or alternatively, the mask is received from an additional computing system, such as a personal computing system associated with an end user.

At block 530, the process 500 involves extracting an image feature map. In some cases, the image feature map is based on one or more of the image mask or the corresponding frame of the video file, such as the initial frame and the initial mask. Additionally or alternatively, the image feature map indicates the initial location of the object. For example, the image feature map is extracted by applying an encoder subnetwork, such as the encoder subnetwork 421, to the mask and the corresponding frame, such as the mask 407 and the corresponding frame 405a. In some embodiments, the image feature map includes one or more image features indicating image attributes of the corresponding frame. Additionally or alternatively, the image feature map includes one or more location features indicating the initial location of the object in the mask. For example, the image feature map includes multiple channels, of which a first channel includes the image features extracted from the frame, and a second channel includes the location features extracted from the mask.

At block 540, the process 500 involves extracting a difference feature map indicating an additional location of the object. In some cases, the difference feature map is based on the image feature map, such as described in regards to block 530. Additionally or alternatively, the difference feature map is extracted by applying a convolutional LSTM subnetwork, such as the convolutional LSTM subnetwork 423, to the image feature map, such as the image feature map 422. For example, the convolutional LSTM subnetwork determines additional location features that indicate the additional object location, based on one or more of image features or locations features included in the image feature map. Additionally or alternatively, the convolutional LSTM subnetwork determines the additional location features based on memory information, such as the initial memory information 415. In some cases, the convolutional LSTM subnetwork receives the memory information as a hidden state.

At block 550, the process 500 involves generating an additional mask, indicating the additional location of the object. In some embodiments, the additional mask is generated by applying a decoder subnetwork, such as the decoder subnetwork 427, to the difference feature map, such as the difference feature map 425. Additionally or alternatively, the additional mask is provided to an additional computing system, such as to the video editing system 130.

In some embodiments, operations related to one or more of the blocks 530, 540, or 550 are repeated for additional video frames depicting the object. For example, for each additional video frame included in the received video, the encoder subnetwork extracts an additional image feature map based on each respective video frame and the mask corresponding to the previous video frame. Additionally or alternatively, the convolutional LSTM subnetwork extracts an additional difference feature map based on the image feature map received from the encoder subnetwork and memory information indicating a previous location of the object in a previous frame. In some cases, the convolutional LSTM subnetwork receives the memory information, such as in the modified difference feature map 425', from a previous iteration of the convolutional LSTM subnetwork (or from an additional convolutional LSTM subnetwork). Additionally or alternatively, for each additional video frame included in the received video, the decoder subnetwork generates an additional image mask based on the additional difference feature map. In some embodiments, operations related to process 500 are used to generate an image mask indicating the object location for each video frame in the received video.

Example Neural Networks

In some embodiments, feature maps are generated by applying one or more of an initializer neural network, an encoder neural network, or a convolutional LSTM neural network. For example, the initializer neural network, encoder neural network, or convolutional LSTM neural network extract one or more features, based on analysis of one or more inputs. Additionally or alternatively, the initializer neural network, encoder neural network, or convolutional LSTM neural network generate one or more feature maps based on the extracted features. In some embodiments, a feature map includes multiple dimensions, multiple channels, or both. For example, a feature map having a height of 4 and a width of 1 is sized with the dimensions 4×1. Additionally or alternatively, if the feature map has 2 channels, the size of the feature map is 4×1×2 (e.g., height of 4, width of 1, 2 channels). Each channel of a feature map includes, for example, one or more features extracted based on the analysis of the one or more inputs.

The extracted features indicate, for example, image attributes or location attributes of a graphical digital image. In some cases, image features, or location features, or both, are extracted based on analysis of a graphical digital image comprising pixels. For example, the encoder neural network is capable of extracting image features based on image attributes of a video frame. In some cases, the encoder neural network is capable of generating an image feature map based on the extracted image features, such as by downsampling the image features to an indicated size of the image feature map. Additionally or alternatively, the initializer neural network is capable of extracting location features based on image attributes of an image mask. The location features are extracted based on analysis of an image mask, such as analysis capable of determining horizontal edges, vertical edges, or other image attributes of the mask. In some cases, the initializer neural network is capable of generating a location feature map based on the extracted location features, such as by downsampling the location features to an indicated size of the location feature map. The size of the image feature map may (but need not be) equivalent to the size of the location feature map.

Furthermore, the convolutional LSTM neural network is capable of extracting additional location features based on analysis of features (e.g., image and/or location features) included in a received feature map. In some cases, the convolutional LSTM neural network is capable of generating a difference feature map based on the extracted additional location features. The size of the difference feature map may (but need not be) equivalent to the size of the location feature map or the image feature map.

In some embodiments, image features, or location features, or both, are extracted based on a combination of image attributes and location attributes. For example, an initializer neural network (such as initializer subnetwork 210 described in regards to FIG. 2) extracts a location feature map based on analysis of a video frame and an image mask. Additionally or alternatively, an encoder neural network (such as encoder subnetwork 421 described in regards to FIG. 4) extracts an image feature map based on analysis of a video frame and an image mask. Furthermore, a convolutional LSTM neural network (such as convolutional LSTM subnetwork 223 described in regards to FIG. 2) extracts a difference feature map based on analysis of a feature map indicating image attributes or location attributes, or both.

In some cases, a mask is generated by applying a decoder neural network. For example, the decoder neural network is capable of generating a mask based on features (e.g., image and/or location features) included in a feature map. In some cases, the decoder neural network is capable of generating the mask by upsampling the features to a digital graphical image.

Figure 6:
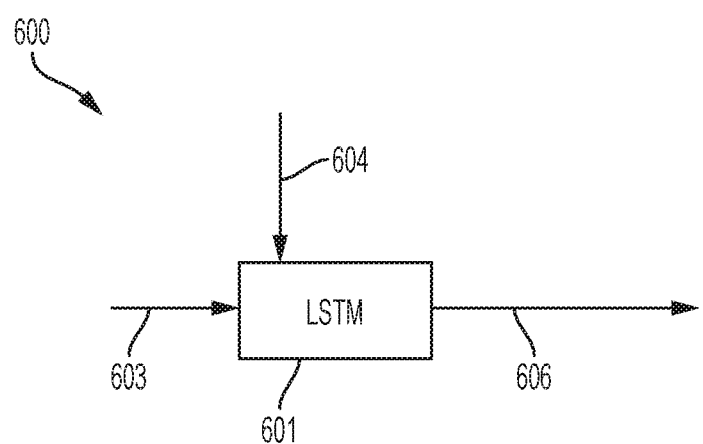
FIG. 6 is a block diagram depicting an example of a neural network that includes a convolutional LSTM component, according to certain embodiments.

In some embodiments, a convolutional LSTM neural network is included in a recurrent neural network ("RNN"). FIG. 6 depicts an example of a neural network 600 including a convolutional LSTM component 601. The neural network 600 is included, for example, in a temporal object segmentation system, such as the temporal object segmentation systems 200 or 400.

In some cases, the convolutional LSTM component 601 receives a first input $x_t$, such as on a connection 603. The first input $x_t$ includes, for example, a set of data at a time t, such as features (e.g., image features, location features) extracted by an encoder neural network from a video frame having a timestamp t (e.g., a current video frame). Additionally or alternatively, the convolutional LSTM component 601 receives a second input $h_{t-1}$, such as on a connection 604. The second input $h_{t-1}$ includes, for example, memory information at a time t−1, such as memory information extracted by the convolutional LSTM component 601, based on an additional video frame having a timestamp t−1 (e.g., a previous video frame).

In the neural network 600, the convolutional LSTM component 601 provides a first output $h_t$ on connection 606. The first output $h_t$ includes, for example, modified memory information at a time t. Additionally or alternatively, the first output $h_t$ is based on a combination (e.g., mathematical analysis, non-linear computation) of the memory information at a time t−1 and the data set at a time t. In some cases, the first output from the convolutional LSTM component 601 includes an indicated modification, such as an indication to modify particular values in the data set at time t or in the memory information at a time t−1. Non-limiting examples of modifications include applying a weight to a value (e.g., multiplying the value by a number between 0 and 1), forgetting a value (e.g., multiplying the value by zero), or remembering a value (e.g., multiplying a value by 1).

In some cases, the memory information received on connection 604 is null memory information. For example, convolutional LSTM subnetwork 423 receives null memory information in the initial memory information 415, as described in regards to FIG. 4. In such cases, the first output $h_t$ from LSTM 601 includes a null modification. For example, based on null memory information in the initial memory information 415, mask 407a is similar to or identical to the initial mask 407.

In some embodiments, a temporal object segmentation system is trained based on known locations of objects depicted by training video sequences. In some cases, training based on object locations improves accuracy of object segmentation performed by the temporal object segmentation system. For example, training based on object locations provides more accurate object locations, as compared to training based on optical flow or motion segmentation. Additionally or alternatively, training based on multiple frames in a training video sequence (e.g., end-to-end sequence training) further improves reliability of object segmentation performed by the temporal object segmentation system. For example, training based on end-to-end sequences (e.g., multiple sequential video frames, as compared to single or non-sequential images) improves recognition of spatial-temporal features, such as features that indicate change over time.

In some embodiments, one or more neural networks included in the temporal object segmentation system are trained on a video dataset. Non-limiting examples of video datasets available for training include the YouTube Video Object Segmentation dataset, the Densely Annotated Video Segmentation dataset, or any other suitable video dataset. In some cases, the temporal object segmentation system is provided a set of training video sequences. In the training set, each frame of each video corresponds to a respective training mask, such as a training mask that indicates a known location of the object(s) in the frame. For example, each training mask includes ground truth annotations for one or more of the objects depicted in the corresponding frame. In some cases, video frames and corresponding training masks are resized, such as reducing a size of the frames and masks to improve use of computing resources (e.g., to reduce memory usage, to increase speed).

Continuing with this example of training, the temporal object segmentation system randomly (or pseudo-randomly) selects a training video sequence. Additionally or alternatively, the temporal object segmentation system randomly (or pseudo-randomly) selects an object depicted by the training video sequence. During training, the temporal object segmentation system generates a mask indicating the location of the selected object in a frame of the training video sequence, as described elsewhere herein. Additionally or alternatively, the temporal object segmentation system compares the generated mask with the corresponding training mask. For example, the determined location of the object, indicated by the generated frame, is compared to the known location of the object, indicated by the ground truth annotation of the training frame. Based on the comparison, an error is computed, indicating a variation between the determined location and the known location of the object. In some cases, one or more components of the temporal object segmentation system are modified based on the computed error. For example, a parameter or operation of an initializer subnetwork, encoder subnetwork, convolutional LSTM subnetwork, or decoder subnetwork are modified based on the computed error. In some embodiments, training of the temporal object segmentation system is continued until convergence is reached, such as by decreasing the error to within a threshold value.

The example neural networks and the training techniques depicted and described herein are for illustrative purposes only. Additional configurations, including networks with fewer, similar, or greater numbers of components, are envisioned, including configurations with unknown numbers of components (e.g., configurations generated via neural network training). Additional training techniques, including techniques with fewer, similar, or greater numbers of training elements, are envisions, including training techniques with unknown numbers of elements (e.g., training is repeated until a threshold accuracy is met).

Example Computing Systems

Figure 7:
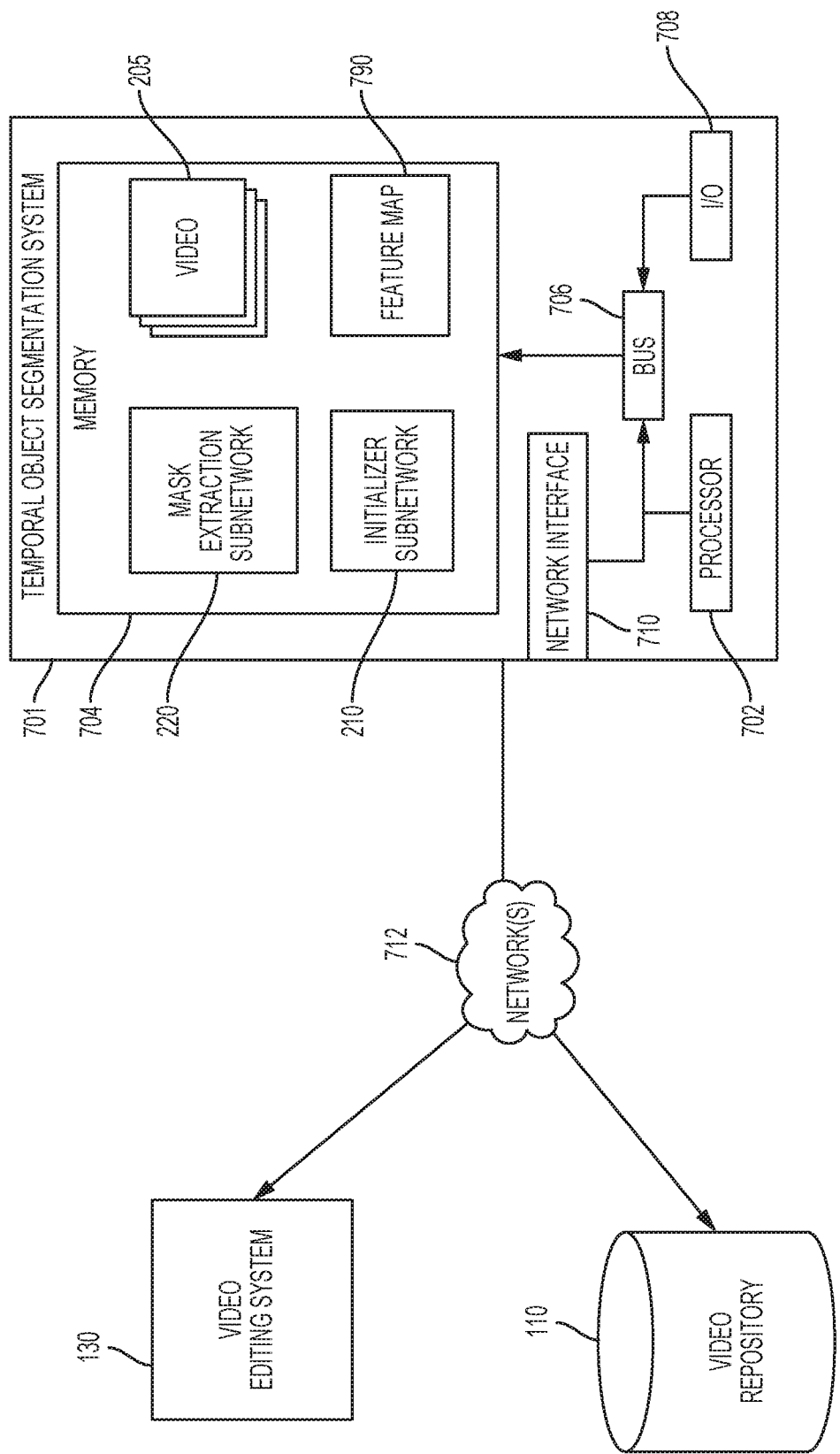
FIG. 7 is a block diagram depicting an example of a computing system capable of implementing a temporal object segmentation system, according to certain embodiments.

Any suitable computing system or group of computing systems can be used for performing the operations described herein. For example, FIG. 7 is a block diagram depicting a computing system capable of implementing a temporal object segmentation system, according to certain embodiments.

The depicted example of a temporal object segmentation system 701 includes one or more processors 702 communicatively coupled to one or more memory devices 704. The processor 702 executes computer-executable program code or accesses information stored in the memory device 704. Examples of processor 702 include a microprocessor, an application-specific integrated circuit ("ASIC"), a field-programmable gate array ("FPGA"), or other suitable processing device. The processor 702 can include any number of processing devices, including one.

The memory device 704 includes any suitable non-transitory computer-readable medium for storing the video 205, the mask extraction subnetwork 220, the initializer subnetwork 210, a feature map 790 (e.g., a location feature map, an image feature map, a difference feature map), and other received or determined values or data objects, as described herein. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The temporal object segmentation system 701 may also include a number of external or internal devices such as input or output devices. For example, the temporal object segmentation system 701 is shown with an input/output ("I/O") interface 708 that can receive input from input devices or provide output to output devices. A bus 706 can also be included in the temporal object segmentation system 701. The bus 706 can communicatively couple one or more components of the temporal object segmentation system 701.

The temporal object segmentation system 701 executes program code that configures the processor 702 to perform one or more of the operations described above with respect to FIGS. 1-6. The program code includes operations related to, for example, one or more of the video 205, the mask extraction subnetwork 220, the initializer subnetwork 210, the feature map 790, or other suitable applications or memory structures that perform one or more operations described herein. The program code may be resident in the memory device 704 or any suitable computer-readable medium and may be executed by the processor 702 or any other suitable processor. In some embodiments, the program code described above, the video 205, the mask extraction subnetwork 220, the initializer subnetwork 210, and the feature map 790 are stored in the memory device 704, as depicted in FIG. 7. In additional or alternative embodiments, one or more of the video 205, the mask extraction subnetwork 220, the initializer subnetwork 210, the feature map 790, and the program code described above are stored in one or more memory devices accessible via a data network, such as a memory device accessible via a cloud service.

The temporal object segmentation system 701 depicted in FIG. 7 also includes at least one network interface 710. The network interface 710 includes any device or group of devices suitable for establishing a wired or wireless data connection to one or more data networks 712. Non-limiting examples of the network interface 710 include an Ethernet network adapter, a modem, and/or the like. The video editing system 130 and the video repository 110 are connected to the temporal object segmentation system 701 via network 712, and the video editing system 130 and the video repository 110 can perform some of the operations described herein, such as providing a video or an initializing mask. The temporal object segmentation system 701 is able to communicate (e.g., provide or receive data) with one or more of the video editing system 130 and the video repository 110 using the network interface 710. Although FIG. 7 depicts the video editing system 130 and the video repository as connected to temporal object segmentation system 701 via the networks 712, other embodiments are possible, including the video editing system 130 or video repository 110 running as programs in the memory 704 of temporal object segmentation system 701.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of generating multiple masks for an object depicted in a video, the method including one or more processing devices performing operations comprising:
   receiving (i) a video file having multiple frames in which an object is at least partially visible and (ii) a first mask corresponding to a first frame of the multiple frames, wherein the first mask indicates a first location of the object in the first frame;
   extracting, from the first frame, a location feature map indicating the first location of the object, by applying an initializer subnetwork to the first frame and the first mask, wherein the initializer subnetwork is trained to determine the first location of the object based on the first mask;
   extracting, from a second frame of the multiple frames, an image feature map indicating attributes of the second frame, by applying an encoder subnetwork to the second frame, wherein the encoder subnetwork is trained to determine the attributes of the second frame based on the second frame;
   extracting a difference feature map indicating a second location of the object, by applying a convolutional long-short term memory ("LSTM") subnetwork to the location feature map and to the image feature map, wherein the convolutional LSTM subnetwork is trained to determine the second location based on the location feature map and the image feature map;
   generating, based on the difference feature map, a second mask indicating the second location of the object, by applying a decoder subnetwork to the difference feature map;
   selecting a training mask that indicates a known location of the object in the second frame;
   determining an error based on a comparison of the generated second mask with the training mask, wherein the error indicates a variation between the second location of the object and the known location of the object; and
   modifying, based on the determined error, one or more of the initializer subnetwork, the encoder subnetwork, the convolutional LSTM subnetwork, or the decoder subnetwork.

2. The method of claim 1, wherein the location feature map extracted by the initializer subnetwork is received as a hidden state by the convolutional LSTM subnetwork.

3. The method of claim 1, the operations further comprising:
generating, subsequent to generating the second mask and based on a third frame of the multiple frames, a third mask indicating a third location of the object in the third frame,
wherein generating the third mask further comprises:
extracting, from the third frame, an additional image feature map indicating attributes of the third frame, by applying the encoder subnetwork to the third frame;
extracting an additional difference feature map indicating a third location of the object, by applying the convolutional LSTM subnetwork to the difference feature map and the additional image feature map; and
generating, based on the additional difference feature map, the third mask indicating the third location of the object, by applying the decoder subnetwork to the additional difference feature map.

4. The method of claim 1, further comprising extracting, from the first frame and by applying the initializer subnetwork, a group of multiple feature maps, wherein the location feature map is included in the group of multiple feature maps.

5. The method of claim 1, wherein the attributes of the second frame indicate graphical or semantic image content of the second frame, including one or more of: edges, colors, gradients, or subject matter depicted in the second frame.

6. The method of claim 1, further comprising providing the first mask and the second mask to a video editing system that is capable of modifying the video based on the first location and the second location of the object.

7. A non-transitory computer-readable medium embodying program code for generating multiple masks for an object depicted in a video, the program code comprising instructions which, when executed by a processor, cause the processor to perform operations comprising:
receiving (i) a video file including multiple frames in which the object is at least partially visible and (ii) a first mask corresponding to a first frame of the multiple frames, wherein the first mask indicates a first location of the object in the first frame;
extracting, from the first frame, a location feature map indicating the first location of the object, by applying an initializer subnetwork to the first frame and the first mask, wherein the initializer subnetwork is trained to determine the first location of the object based on the first mask;
extracting, from a second frame of the multiple frames, an image feature map indicating attributes of the second frame, by applying an encoder subnetwork to the second frame, wherein the encoder subnetwork is trained to determine the attributes of the second frame based on the second frame;
extracting a difference feature map indicating a second location of the object, by applying a convolutional long-short term memory ("LSTM") subnetwork to the location feature map and to the image feature map, wherein the convolutional LSTM subnetwork is trained to determine the second location based on the location feature map and the image feature map;
generating, based on the difference feature map, a second mask indicating the second location of the object, by applying a decoder subnetwork to the difference feature map;
selecting a training mask that indicates a known location of the object in the second frame;
determining an error based on a comparison of the generated second mask with the training mask, wherein the error indicates a variation between the second location of the object and the known location of the object; and
modifying, based on the determined error, one or more of the initializer subnetwork, the encoder subnetwork, the convolutional LSTM subnetwork, or the decoder subnetwork.

8. The non-transitory computer-readable medium of claim 7, wherein the location feature map extracted by the initializer subnetwork is received as a hidden state by the convolutional LSTM subnetwork.

9. The non-transitory computer-readable medium of claim 7, the operations further comprising:
generating, subsequent to generating the second mask and based on a third frame of the multiple frames, a third mask indicating a third location of the object in the third frame, wherein generating the third mask further comprises:
extracting, from the third frame, an additional image feature map indicating attributes of the third frame, by applying the encoder subnetwork to the third frame;
extracting an additional difference feature map indicating the third location of the object, by applying the convolutional LSTM subnetwork to the difference feature map and the additional image feature map; and
generating, based on the additional difference feature map, the third mask indicating the third location of the object, by applying the decoder subnetwork to the additional difference feature map.

10. The non-transitory computer-readable medium of claim 9, wherein the difference feature map is received as a hidden state by the convolutional LSTM subnetwork.

11. The non-transitory computer-readable medium of claim 7, further comprising providing the first mask and the second mask to a video editing system that is capable of modifying the video based on the first location and the second location of the object.

12. An object segmentation system for generating a group of masks for an object depicted in a video, the object segmentation system comprising:
a memory device storing instructions which, when executed by a processor, implement a mask extraction subnetwork, the mask extraction subnetwork including an encoder subnetwork, a convolutional long-short term memory ("LSTM") subnetwork, and a decoder subnetwork;
a means for receiving (i) a video file including multiple frames in which the object is at least partially visible and (ii) a initializing mask, wherein the initializing mask indicates an initial location of the object in a first frame of the multiple frames;
a means for extracting, from the first frame, a first image feature map indicating attributes of the first frame by applying the encoder subnetwork to the first frame and the initializing mask, wherein the encoder subnetwork is trained to determine the attributes based on the first frame and the initializing mask;

a means for extracting a difference feature map indicating a first location of the object, by applying the convolutional LSTM subnetwork to the first image feature map, wherein the convolutional LSTM subnetwork is trained to determine the first location of the object based on the first image feature map;

a means for generating, based on the difference feature map, a first mask indicating the first location of the object, by applying the decoder subnetwork to the difference feature map;

a means for selecting a training mask associated with the first frame, the training mask indicating a known location of the object in the first frame;

a means for determining an error based on a comparison of the generated first mask with the training mask associated with the first frame, wherein the error indicates a variation between the first location of the object and the known location of the object; and a means for modifying, based on the determined error, the object segmentation system.

13. The system of claim 12, wherein the first image feature map indicates image attributes and location attributes.

14. The system of claim 12, wherein the convolutional LSTM subnetwork is trained to determine the first location of the object based on the first image feature map based on memory information received as a hidden state by the convolutional LSTM subnetwork.

15. The system of claim 12, further comprising:

a means for generating, based on the first mask and a second frame of the multiple frames, a second mask indicating a second location of the object in the second frame, wherein the means for generating the second mask further comprises:

a means for extracting, from the second frame, a second image feature map indicating additional attributes of the second frame, by applying the encoder subnetwork to the second frame and the first mask;

a means for extracting an additional difference feature map indicating the second location of the object, by applying the convolutional LSTM subnetwork to the difference feature map and the second image feature map; and a means for generating, based on the additional difference feature map, the second mask indicating the second location of the object, by applying the decoder subnetwork to the additional difference feature map.

16. The system of claim 12, further comprising a means for extracting, from the first frame and by applying the encoder subnetwork, a group of multiple feature maps, wherein the first image feature map is included in the group of multiple feature maps.

17. The system of claim 12, further comprising providing the generated first mask to a video editing system that is capable of modifying the video based on the first location of the object.

* * * * *